Figure 1:
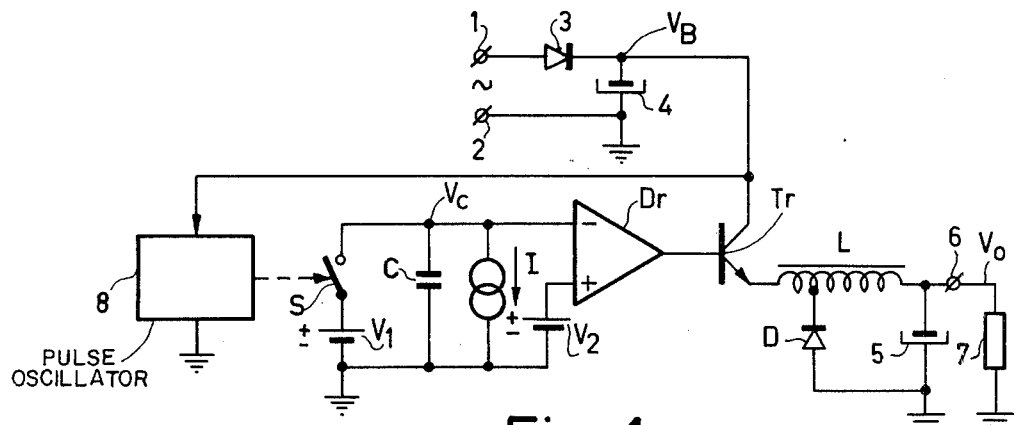

United States Patent [19]

Teuling

[11] 4,079,294
[45] Mar. 14, 1978

[54] CONTROL CIRCUIT ARRANGEMENT FOR GENERATING A CONTROL SIGNAL FOR A VOLTAGE CONVERTER

[75] Inventor: Dirk Johan Adriaan Teuling, Eindhoven, Netherlands

[73] Assignee: U.S. Philips Corporation, New York, N.Y.

[21] Appl. No.: 697,050

[22] Filed: Jun. 17, 1976

[30] Foreign Application Priority Data

Jun. 23, 1975 Netherlands .................... 7507437

[51] Int. Cl.² .................. H04N 3/18; H02P 13/18
[52] U.S. Cl. .................... 315/411; 323/DIG. 1; 363/21; 363/49
[58] Field of Search .......... 321/2; 323/DIG. 1, 17; 315/408, 411; 363/21, 49

[56] References Cited

U.S. PATENT DOCUMENTS

| | | | |
|---|---|---|---|
| 3,383,584 | 5/1968 | Atherton | 323/DIG. 1 |
| 3,733,540 | 5/1973 | Hawkins | 323/DIG. 1 |
| 3,959,714 | 5/1976 | Mihelich | 323/DIG. 1 |

FOREIGN PATENT DOCUMENTS

| | | | |
|---|---|---|---|
| 2,313,708 | 9/1974 | Germany | 323/17 |
| 2,320,229 | 11/1974 | Germany | 321/2 |
| 1,962,133 | 6/1971 | Germany | 323/DIG. 1 |

Primary Examiner—William H. Beha, Jr.
Attorney, Agent, or Firm—Frank R. Trifari; Bernard Franzblau

[57] ABSTRACT

Control circuit for controlling a switched converter generating an output voltage which is independent of variations of the input voltage. For this purpose, a forward control is used with a sawtooth voltage of which both the variation during the pulse duration of the pulses applied to the switch of the converter and the slope are linear functions of the input voltage and of an adjusting voltage. The output voltage is proportional to the adjusting voltage. This can be derived from the output voltage by means of a feedback coupling.

21 Claims, 10 Drawing Figures

CONTROL CIRCUIT ARRANGEMENT FOR GENERATING A CONTROL SIGNAL FOR A VOLTAGE CONVERTER

The invention relates to a control circuit arrangement for generating a periodic pulsatory control signal for controlling a switch in a converter for converting an input direct voltage into an output direct voltage which is substantially independent of variations of the input voltage. The control circuit comprises a current source and a controllable switch for generating a sawtooth voltage across a capacitor as well as a threshold level detector for converting the sawtooth voltage into said pulsatory control signal, the pulse duration being controllable under the influence of an adjusting voltage.

In such a circuit arrangement the use of negative feedback is rather universal. This means that a voltage derived from the output voltage is compared with a reference voltage and that, depedent upon the error signal formed in this manner, the pulse duration of the control signal is varied. As a result of this the output voltage is made independent of variations of the input voltage, which variations may be caused by variations of the voltage of the electric supply source from which the input voltage is derived by means of rectification.

With a sufficiently high amplification factor of the negative feedback loop the influence of slow variations of the input voltage on the output voltage can in this manner be removed substantially. However, the influence of rapid variations is more difficult to remove. Not only is the output voltage generated across a smoothing capacitor, but the loop itself introduces a delay since a given bandwidth is associated with a given stabilization factor. Such a rapid variation of the input voltage is caused by the ripple superimposed thereon and remaining after rectification and filtering. Usually the control signal is not capable of removing a leading edge of the ripple voltage. In television receivers, for example, the requirement applies that the deflection voltage should remain constant within 0.1 percent so as not to cause disturbing variations of the image width. When the ripple voltage is 10% of the input voltage, a stabilization factor of 100 is necessary, which corresponds to an inertia which is too great.

It will be obvious that a solution can be provided by a better filtering of the ripple voltage, that is by means of electrolytic capacitors of greater capacitance, choke coils and the like. This unfortunately results in more expensive and bulky circuit arrangements. Still another drawback remains, namely the fact that the loop amplification is larger for a higher value of the input voltage. In order to avoid instability the amplification should be made smaller, as a result of which it cannot be optimum for the nominal value of the input voltage.

French Patent Application No. 2,225,879 discloses a control circuit for a converter in which the feedback coupling is combined with a forward control. Thus information on the variations of the input voltage is also supplied to the control circuit. By means of this information the conduction time of the switch of the converter also is influenced. Due to the choice of said information, in some cases, the patent application that states a complete compensation can be achieved, whereas in some other cases the compensation is only partial.

It is an object of the invention to provide a universal control circuit arrangement by means of which the influence of all variations of the input voltage can substantially entirely be removed accurately and without inertia, the ripple voltage also having substantially no influence, without more effective smoothing taking place and which can be used in converters of any type. For that purpose, the control circuit arrangement according to the invention is characterized by a first circuit having a first and a second input terminal and means for adjusting the value of the current generated by the current source as a linear function of both the input direct voltage and an adjusting voltage, and by a second circuit likewise having a first and a second input terminal and means for adjusting the variation of the sawtooth voltage during the occurrence of the control signal as a linear function of both the input direct voltage and the adjusting voltage, the two first input terminals being connectable to the input direct voltage and the two second input terminals being connectable to the adjusting voltage.

Due to the measure according to the invention the output voltage depends only on the adjusting voltage and can therefore be adjusted at will and with the desired accuracy. The circuit arrangement according to the invention may also be characterized by a feedback circuit for generating the adjusting voltage, which feedback circuit comprises a comparison stage for comparing the output voltage with a reference voltage. As a result of this a circuit arrangement is obtained which shows both the advantages of the forward control mentioned above and the known advantages of a backward control.

Figure 2:
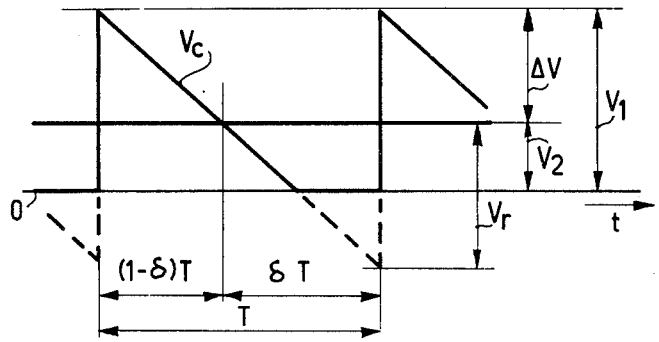
Figure 3:
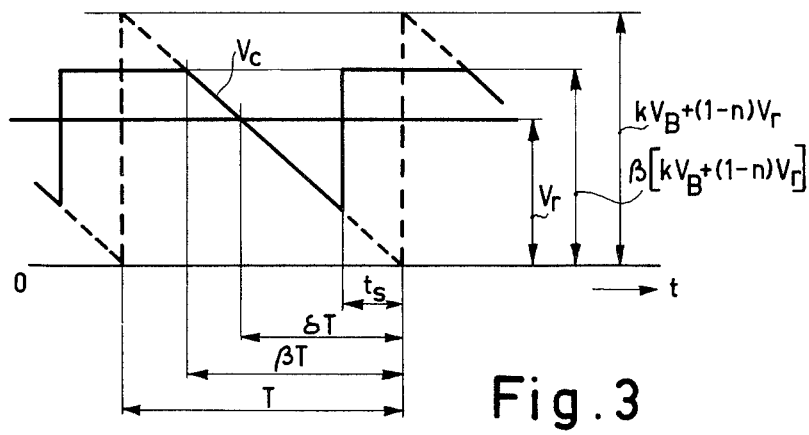
Figure 4:
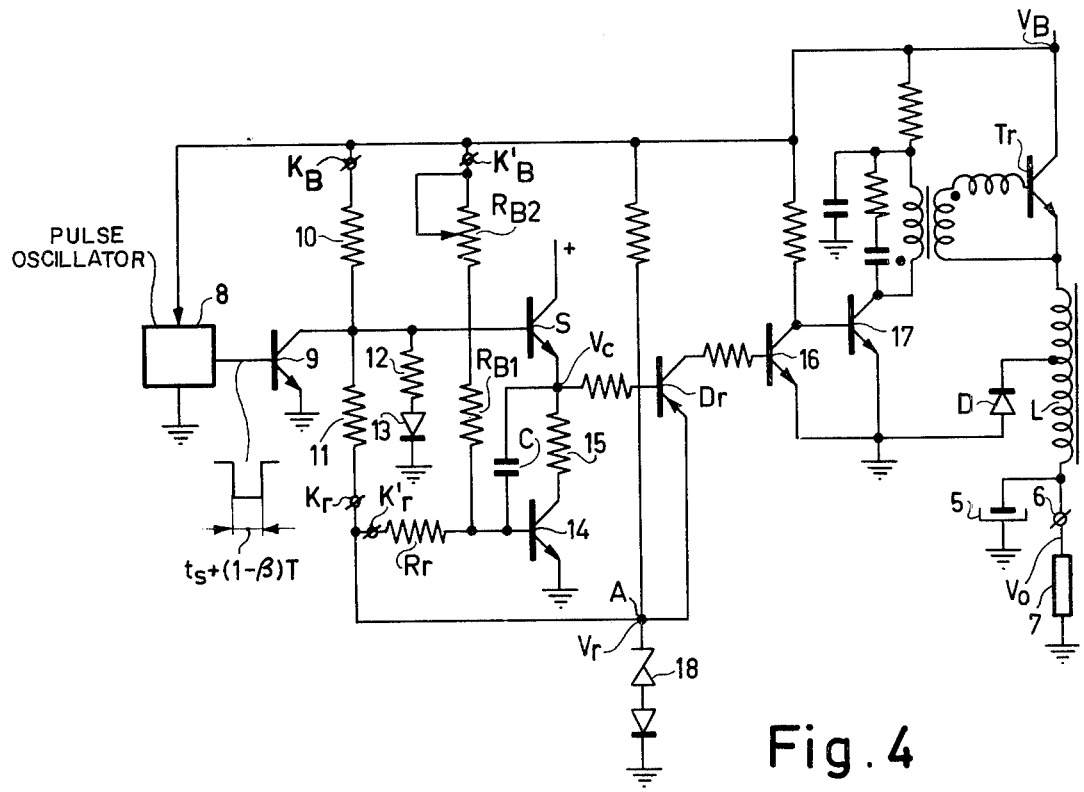
Figure 5:
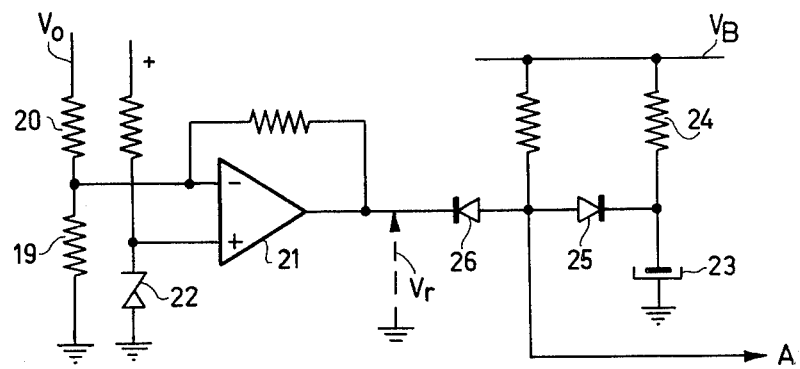
Figure 6:
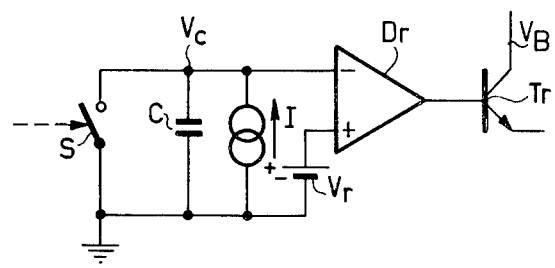
Figure 7:
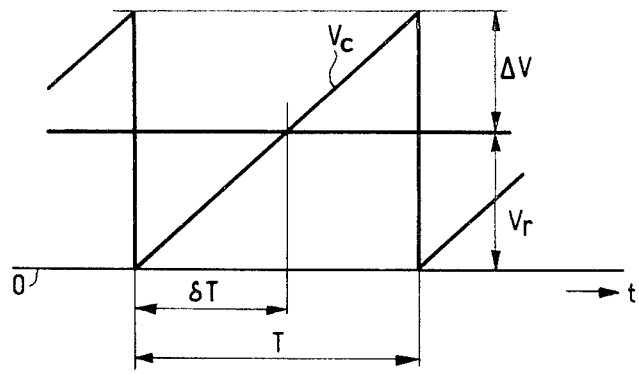
Figure 8:
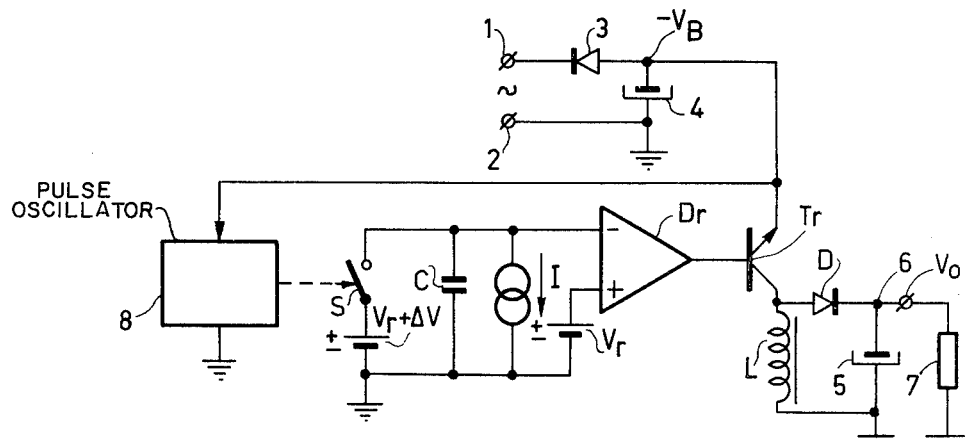
Figure 9:
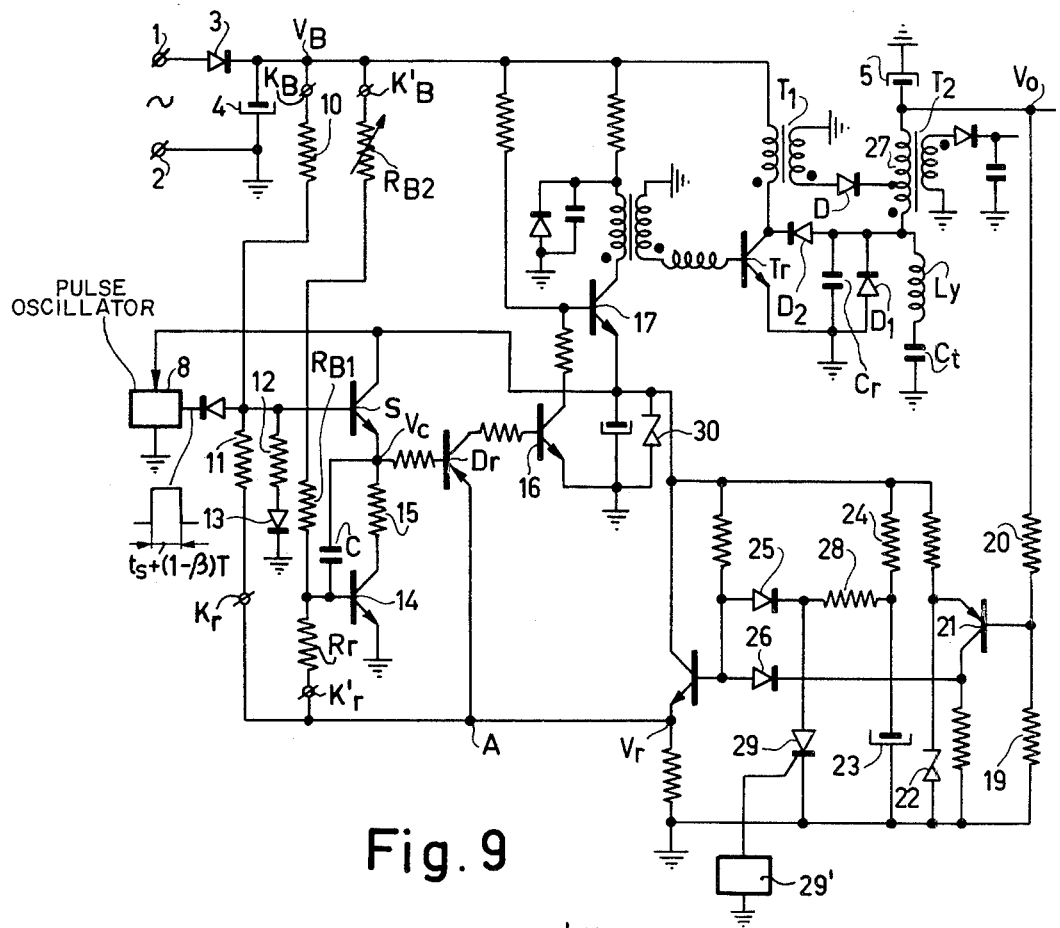
Figure 10:
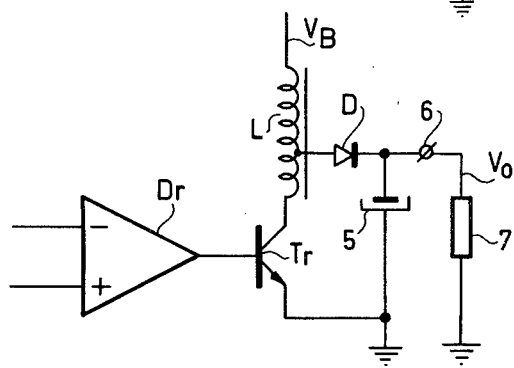

The invention will be described in greater detail, by way of example, with reference to the accompanying drawing, in which:

FIG. 1 shows a first principle circuit diagram of the control circuit arrangement according to the invention, FIG. 2 shows a waveform occurring therein, FIG. 3 shows a waveform which is varied with respect to that of FIG. 2, FIG. 4 shows an embodiment of the control circuit arrangement according to the invention in which the waveform of FIG. 3 occurs, FIG. 5 shows a part of a circuit arrangement according to the invention, FIG. 6 shows a second principle circuit diagram of the control circuit arrangement according to the invention, FIG. 7 shows a waveform occurring therein, FIG. 8 shows a third principle circuit diagram of the control circuit arrangement according to the invention, FIG. 9 shows a part of the circuit diagram of a television receiver provided with an embodiment of a control circuit according to the invention, and FIG. 10 shows a so-called "up converter" for which the control circuit according to the invention is suitable.

FIG. 1 shows a switched-mode voltage supply circuit of the series type. The AC supply voltage present between two input terminals 1 and 2 is rectified by a rectifier 3 and the resulting voltage is smoothed by means of a capacitor 4. A direct voltage $V_B$ is available across capacitor 4 which follows the variations of the supply voltage and on which a ripple voltage of supply frequency, or double thereof if rectifier 3 is of the Graetz type, is superimposed. The end of the capacitor 4 connected to the terminal 2 is connected to ground. The converter further comprises an npn-switching transistor Tr, an inductance L having a tap connected to the cathode of a diode D, and a smoothing capacitor 5. The collector of transistor Tr is connected to the junction point of elements 3 and 4 and the emitter is connected to one end of inductance L. The anode of diode D and the free end of capacitor 5 are connected to ground. The other end of inductance L forms an output terminal 6 at which a direct voltage $V_o$ is present. A load 7 is connected between terminal 6 and ground.

Periodic control pulses are supplied to the base of transistor Tr so that it is alternately conductive and cut off. If $\delta T$ is the part of the cycle T in which the transistor Tr is conductive and if $1 : n$ is the ratio of the total number of turns of inductance L to the number of turns thereof between the tap and the terminal 6, the following relationship between voltages $V_B$ and $V_o$ can be derived:

$$V_o = \frac{n\delta V_B}{1 - (1 - n)\delta} \quad (1)$$

This relationship assumes that inductance L is discharged incompletely at the end of the cut-off time of transistor Tr.

In known circuit arrangements the ratio $\delta$ is varied by means of negative feedback to provide a pulse duration modulation in a manner such that the variation of the output voltage $V_o$ is independent of variations of input voltage $V_B$. In a special case, $V_o$ can be kept constant. For this purpose voltage $V_o$ should be compared with a reference voltage.

In FIG. 1 the control circuit arrangement of transistor Tr comprises an oscillator 8 which generates pulses of a frequency of, for example, 10 to 20 kHz. These pulses are applied to a controllable switch S which is connected in series with a voltage source $V_1$. A capacitor C and a current source I are connected parallel to said series arrangement, the free connections of elements 8, $V_1$, C and I being connected to ground. Capacitor C is connected to an input terminal of a threshold level detector Dr to another input terminal of which a voltage source $V_2$ is connected, voltage $V_2$ being lower than voltage $V_1$. The output terminal of the level detector Dr controls the base of transistor Tr, possibly via a driver stage, not shown.

FIG. 2 shows the variation as a function of time of the voltage $V_C$ across capactior C. By a shortlasting conduction of the switch S, voltage $V_C$ assumes the value $V_1$ so that transistor Tr is cut off. The switch S is cut off and capacitor C is discharged by current source I. Voltage $V_C$ therefore decreases linearly, the slope of the resulting sawtooth being determined by the current I. At the instant at which $V_C$ falls below the value $V_2$, the transistor Tr becomes conductive. It remains conductive until the switch S, after a time interval $\delta T$, receives a pulse from oscillator 8 and is again made conductive for a short period of time which introduces the beginning of a new cycle.

The following values are chosen:

$V_1 = kV_B$ $V_2 = nV_r$ and $I = C/T [V_1 + (1 - n) V_r]$, wherein $k$ is a number to be chosen and $V_r$ is an adjusting voltage still to be chosen. Current I causes in one cycle a reduction of the voltage across the capacitor equal to $$IT/C = V_1 + (1 - n) V_r$$

Voltage $V_C$ reaches the value $V_2$ after a time $(1 - \delta)T$ which, as shown in FIG. 2, satisfies the following relationship:

$$\frac{(1 - \delta) T}{V_1 - V_2} = \frac{T}{V_1 + (1 - n) V_r}$$

When herein the above chosen values are filled in, it may be derived that $$V_r = \frac{k\delta V_b}{1 - (1 - n) \delta} .$$

Herewith it is proved that formula (1) is satisfied, provided the value $$V_r = k/n \, V_o$$

is chosen for the adjusting voltage as a function of the desired output voltage $V_o$. In other words, the output voltage is determined by the adjusting voltage since it is proportional thereto and is independent of the variations of the input voltage and without negative feedback being used. The adjusting voltage can be accurately adjusted so that the output voltage is fixed with the same accuracy, while it can supply considerably more power.

In a practical circuit arrangement for a television receiver in which the oscillator 8 is the line oscillator of the receiver, it applies that:
$T = 64$ $\mu$s. If $n = 0.8$ and a value of 0.01 is chosen for $k$, then the value of Vr is equal to 3V for a constant value of $V_o/n = 300$ V. For C a capacitor of 4.7 nF is chosen. Current I is the sum of two currents, namely $kC/T \, V_B$ and $C/T \, (1 - n) \, V_r$. If the first current is derived from the voltage $V_B$ via a resistor $R_B$, then it applies that $R_B = T/kC = 1.36 \, M \, \Omega$.

Similarly, the second current can be derived via a resistor $R_r$ from voltage $V_r$ so that it applies that $$R_r = \frac{T}{(1 - n) C} = 68 \, k \, \Omega ,$$

while the voltages $V_1$ and $V_2$, respectively, can be derived from the voltages $V_B$ and $V_r$, respectively, by means of a resistive potentiometer.

In FIG. 2, capacitor C is discharged entirely so that voltage $V_C$ becomes zero before the end of the cycle. Of course, this is not necessary. The broken lines in the Figure show the variation of voltage $V_C$ in the case in which said voltage decreases linearly during the whole cycle. It may be noted that the level at which transistor Tr becomes conductive is higher than the resulting minimum value of voltage $V_C$ by an amount equal to $V_2$ increased by the voltage drop caused by the above-mentioned second current, that is $V_2 + (1 - n) \, V_r = V_r$, that is the adjusting voltage, while the variation of voltage $V_C$ during the cut off period $(1 - \delta)T$ of transistor Tr is equal to $$\Delta V = V_1 - V_2 = kV_B = nV_r$$

From this it appears that both I and $\Delta V$ are linear functions of $V_B$ and $V_r$. In the special case in which $n$ = 1, i.e. where diode D is not connected to a tap on the inductance L but to the junction point thereof with the emitter of the transistor Tr, the current I does not depend on $V_r$. When the variation $\Delta V$ varies, for example because the voltage $V_B$ varies, then the value of voltage $V_c$ in FIG. 2 does not vary at the final instant of the period T. Actually, this final value depends only on voltages $V_2$ and $V_r$.

It has been assumed above that the conduction time of the switch S is infinitely short and coincides with the instant at which the cycle is completed. In practice, however, the transistor Tr has a finite switching-off time in the order of 7 to 10 μs, so that switch S must be conductive at least during said time $t_s$. It is also possible to keep the switch S conductive still longer. FIG. 3 shows the variation of the resulting voltage $V_C$ in which switch S is made conductive a time $t_s$ μs before the end of the cycle and is cut off again at an instant of time βT μs before the end of the next cycle. It appears from FIG. 3 that the total amplitude $kV_B + (1 - n) V_r$ of the sawtooth voltage should be multiplied by a factor β and that the sawtooth waveform is truncated.

The above results in the embodiment of the control circuit arrangement according to the invention shown in FIG. 4. Line oscillator 8 applies blocking pulses having a duration $t_s + (1 - \beta)T$ to the base of a transistor 9 the collector of which controls the base of the switch S constructed as an emitter follower transistor, said switch being conductive during the occurrence of the pulses from oscillator 8. By means of a resistor 10 incorporated between the base of transistor S and a terminal $K_B$, a resistor 11 incorporated between the same base and a terminal $K_r$ and the series arrangement of a resistor 12 and a diode 13 between the base and ground, terminal $K_B$ being connected to the voltage $V_B$ carrying line and terminal $K_r$ being connected to the voltage $V_r$ carrying line, it is ensured that the emitter of transistor S during its conduction time has the voltage $\beta[kV_B + (1 - n)V_r]$. For example, when $k = 0.01$, $\beta = 0.75$ and $n = 0.5$ it is derived that the values of resistors 10, 11 and 12 may be approximately 390 kΩ, 7.8 kΩ and 4.7 kΩ. The voltage drop across diode 13 compensates for the voltage difference between the base and the emitter of transistor S.

Capacitor C is connected between the emitter of transistor S and the base of a transistor 14, to the base of which resistor $R_r$ and the series arrangement of a fixed resistor $R_{B1}$ and an adjustable resistor $R_{B2}$ are connected. Resistors $R_r$ and $R_{B2}$, respectively, are connected at one end to terminals $K'_r$ and $K'_B$, respectively, terminal $K'_B$ being connected to the voltage $V_B$ carrying line and terminal $K'_r$ being connected to the voltage $V_r$ carrying line. The resistor $R_{B2}$ is adjusted so that the sum of the values $R_{B1}$ and $R_{B2}$ is equal to the above found value of resistor $R_B$. The emitter of transistor 14 is connected to ground while that of transistor S and the collector of transistor 14 are connected together via a resistor 15 of, for example, 1.5 kΩ. During the charging of capacitor C the resistor 15 limits the collector current of transistor 14.

During the time interval βT transistor 9 is conductive so that transistor 15 is cut off. Capacitor C discharges across resistor 15 in which the discharge current I is also the collector current of transistor 14 and is therefore much greater than the base current which keeps the transistor conductive. Elements S, 14, 15 and C form a Miller oscillator so that the voltage $V_C$ present at the emitter of transistor S has a good linearity. Because capacitor C is incorporated in the base line of a transistor, resistors $R_r$ and $R_{B1} + R_{B2}$ may indeed be considered as current sources. Threshold level detector Dr consists of a pnp transistor the emitter of which has a voltage $V_r$ and the base of which is connected to the voltage $V_C$. During the interval δT transistor Dr is conductive, in which interval a positively directed pulse is formed at its collector. This pulse is reversed by a transistor 16 so that a driver transistor 17 is cut off. The transistor Tr is controlled by a transformer and is made conductive in the interval δT in which transistor 17 is cut off. Voltage $V_r$ is generated at a point A by means of a Zener diode 18 in series with a compensating diode.

Thus the circuit arrangement shown in FIG. 4 comprises a first circuit having terminals $K_B$ and $K_r$ and a second circuit having terminals $K'_B$ and $K'_r$. When the former terminals are connected to voltages $V_B$ and $V_r$, respectively, and when the correct values are chosen for resistors 10, 11 and 12, the amplitude variation of voltage $V_c$ assumes the desired value. When terminals $K'_B$ and $K'_r$ are connected to voltages $V_B$ and $V_r$, respectively, and when the correct values are chosen for resistors $R_{B1} + R_{B2}$, the current I assumes the desired value. Both the said amplitude variation and the current are linear functions of voltages $V_B$ and $V_r$. For the above-mentioned case in which $n = 1$, terminals $K_r$ and $K'_r$ are not connected.

The above description relates to a forward control in which the circuit arrangement does not receive information as regards the output voltage $V_o$. However, it may be desirable to also use a backward control. For this purpose the adjusting voltage $V_r$ may be determined by a feedback coupling: it is hence not fixedly adjusted. The advantage of this measure is that the influence of tolerances and of the temperature are removed by the feedback regulation. This also applies to the influence of possible variations of load 7 on the voltage $V_o$ so that this might vary all the same. Because the value of voltage $V_o$ is proportional to that of $V_r$, the amplification of the negative feedback loop is constant. Therefore, this loop can be designed optimally without the danger of instability at higher input voltages. FIG. 5 shows how the voltage $V_r$ can be obtained. A voltage derived from $V_o$ by means of a resistive potentiometer 19, 20 is applied to an input terminal of a differential amplifier 21. A reference voltage present across a Zener diode 22 is applied to the other input terminal of the amplifier 21. The difference between the two input voltages of the amplifier is amplified to the desired value of adjusting voltage $V_r$, which voltage is available at the output terminal of the amplifier. A current originating from a voltage source of, for example, 12 V flows through Zener diode 22. This source, which can also supply the collector current of transistor S in FIG. 4, may be derived either from voltage $V_B$ or from voltage $V_o$. So the circuit arrangement of FIG. 5 may replace the Zener diode 18 of FIG. 4.

It should be noted that in the known circuit arrangements in which only negative feedback coupling is used, the ratio δ is controlled in accordance with the output voltage $V_o$. With the measure described above δ varies in accordance with input voltage $V_B$ and is readjusted under the influence of variations of voltage $V_o$.

A requirement of a switched-mode voltage supply circuit arrangement is that the output voltage thereof should rise slowly after switching on. Otherwise, the peak current through the transistor Tr might become too large since capacitor 5 is not yet charged. This can be achieved by causing voltage $V_B$ to rise slowly but it will be obvious that it is more practical to cause the ratio $\delta$ to grow slowly from zero. The result of this is, however, that the ripple voltage at the input is transferred to the output, which again may cause too large a peak current through the transistor. As a result of this a safety circuit may respond so that the supply circuit arrangement cannot start. A solution for this is to cause adjusting voltage $V_r$ to grow slowly too during the starting period.

An embodiment of this idea is also shown in FIG. 5. A capacitor 23 is charged by a current originating from source $V_B$ which flows through a resistor 24, the time constant being large. The junction point of elements 23 and 24 is connected via two diodes 25 and 26 to the output terminal of the difference amplifier 21, the diodes being polarized so that as between the voltage at the amplifier output terminal and the voltage across capacitor 23, they pass the lower voltage. After switching on, the last-mentioned voltage slowly increases. The ratio $\delta$ and consequently the voltage $V_o$ also increase slowly. As a result of the operation of amplifier 21, voltage $V_r$ has a high value. The result of this is that the diode 25 is conductive. The junction point of diodes 25 and 26 is connected to the point A in FIG. 4, in which the Zener diode 18 is omitted, so that the voltage at point A, which serves as an adjusting voltage, starts slowly indeed. At the instant at which the voltage at the junction point of resistors 19 and 20 reaches the value of the reference voltage across Zener diode 22, voltage $V_r$ decreases. At a given instant, diode 26 therefore becomes conductive while diode 25 is cut off. In the final condition voltages $V_o$ and $V_r$ are proportional to each other.

The above description relates to circuit arrangements in which transistor Tr is conductive at the end of the cycle in FIG. 1, that is to say in the last part of the discharge period of capacitor C. The circuit arrangement shown in FIG. 1 and hence also embodiments derived therefrom can, however, be proportioned so that transistor Tr is conductive at the beginning of the discharge period of capacitor C. In FIG. 2 the time intervals $\delta T$ and $(1 - \delta)T$ and in FIG. 1 the input terminals of the threshold detector Dr should then be interchanged. If in that case the following is chosen:

$$\Delta V = n(V_B = V_r)$$

and $$I = C/T\,[nV_B + (1 - n)\,V_r]$$

wherein $\Delta V$ is the variation of voltage $V_C$ during the cut off time of transistor Tr, then the variation $V_C$ during the conduction time thereof is equal to $V_r$ and it applies that:

$$V_r = \frac{I\delta T}{C} = n\delta V_B + (1 - n)\,\delta\,V_r,$$

which is not too different from formula (1). In this case too, both I and $\Delta V$ are linear functions of $V_B$ and $V_r$, while the voltages $V_o$ and $V_r$ are proportional to each other.

In FIG. 6, capacitor C is not discharged by the current I as is the case in FIG. 1, but is charged. A voltage source in series with the switch S is therefore not necessary. In this Figure are shown only those elements which are of importance now. The variation of the voltage $V_C$ across capacitor C as a function of time is plotted in FIG. 7. It has an ascending sawtooth shape whereas the sawtooth shape in FIG. 2 is descending. When variation $\Delta V$ varies, for example because voltage $V_B$ varies, then the value of voltage $V_c$ in FIG. 7 does not vary at the initial instant of period T. When transistor Tr is conductive in the first part of the cycle and if the same values are chosen as in the corresponding case of the descending sawtooth, then it can be seen that formula (1) is satisfied. Both I and the variation $\Delta V$ of the sawtooth voltage during the cut off time of transistor Tr are linear functions of $V_B$ and $V_r$. It can be proved in the same manner as above for the descending sawtooth that this is the case also if transistor Tr is conductive in the second part of the cycle of the ascending sawtooth.

All of the embodiments described relate to switched converters of the series types (forward converters) for which formula (1) applies. FIG. 8 shows a circuit arrangement having a parallel converter (flyback converter) which is a circuit arrangement in which inductance L and diode D have changed places as compared with those of FIG. 1, while voltage $V_B$ must be negative and transistor Tr is of the npn-type, and which circuit is controlled in the same manner as in FIG. 1. It can be proved that for series converters and parallel converters the following relationship applies:

$$V_o = \frac{n\,\delta\,V_B}{1 - (1 - m)\,\delta} \qquad (2)$$

Formula (2) changes into formula (1) if $m = n$: this is the series converter while the parallel converter satisfies formula (2) with $m = 0$. In view of the resemblance of formula (2) to formula (1) it will be obvious that the circuit arrangement according to the invention may be used indeed for the control of a parallel converter, in which current I and voltage variation $\Delta V$ can be proportioned in a similar manner as above.

A circuit arrangement which also satisfies formula (2) and for which therefore the circuit arrangement according to the invention may be used is the combined line deflection and supply voltage circuit for a television receiver described in U.S. Pat. No. 3,950,674 and which is shown in FIG. 9 of the present patent application. It will be sufficient here to state that Ly is the line deflection coil, $C_t$ is the trace capacitor and $C_r$ is the retrace capacitor, while $D_1$ is the parallel diode, and that inductance L is constructed as a transformer $T_1$, while diode D is connected to a tap on a winding 27 of a transformer $T_2$. Transformer $T_1$ has a transformation ratio of 1 : n and the ratio of the number of turns of winding 27 to that of the above shown part thereof is equal to 1 : m, wherein n and m are the parameters which occur in formula (2). Supply voltages for parts of the receiver and also the high tension for the final anode of a picture display tube (not shown) are formed across secondary windings of the transformer $T_2$. Transformers $T_1$ and $T_2$ may in known manner have one and the same core.

The voltage across the capacitor 5 in series with the winding 27 may serve as the output voltage $V_o$. By means of the circuit arrangement shown in FIG. 5 an adjusting voltage $V_r$ is obtained in which amplifier 21 is constructed by means of an npn-transistor. Between diode 25 and the junction point of resistor 24 and capacitor 23, a low value resistor 28 is incorporated and a safety thyristor 29 is connected between ground and the junction point of diode 25 and resistor 28. Thyristor 29 is made conductive by a safety circuit 29' for example, when the current consumed by the circuit arrangement is too large so that capacitor 23 is discharged. The junction point of diodes 25 and 26 is connected to point A via an emitter follower. The voltage across a Zener diode 30 incorporated in the emitter lead of the transistor 17 serves as a stabilized supply voltage for the starting circuit, for switch S as well as for oscillator 8, which voltage is present immediately after switching on.

The following values have been chosen in practice:
$n = 0.49$
$m = 0.29$
$\beta = 0.8$
$k = 0.01$
$C = 4.7$ nF
value of resistor $10 = 390$ k $\Omega$. Oscillator 8 is an integrated circuit Philips type TBA 920. It has been found that the voltage $V_o$ has a substantially constant value of 140 V and is substantially free from ripple at the supply frequency with a variation of voltage $V_B$ between 200 and 370 V on which a ripple voltage of approximately 30 V peak-to-peak is superimposed. Capacitor 4 may have a comparatively small capacitance of 100 $\mu$F or even lower.

FIG. 10 shows a switched converter for which formula (2) does not apply. In this circuit arrangement (termed in English an "up converter") inductance L is connected between the lead supplying voltage $V_B$ and switch Tr, while diode D is incorporated between a tap on inductance L and output terminal 6. If 1 : n is the ratio of the number of turns of inductance L to the number of turns shown above the tap, the following relationship may be derived:

$$V_o = \frac{1 - (1 - n)\delta}{1 - \delta} V_B \quad (3)$$

It can be seen that the circuit arrangement according to the invention may be used in this case too in which the sawtooth voltage is either ascending or descending. FIG. 10 shows detector Dr. In this case too both current I and voltage variation $\Delta V$ are linear functions of input voltage $V_B$ and of an adjusting voltage $V_r$ which is proportional to the desired output voltage $V_o$, however, with the understanding that $\Delta V$ is the variation of voltage $V_C$ in the time interval $\delta T$ in which transistor Tr is conductive. In the special case in which $n = 1$, i.e. in which diode D is not connected to a tap on inductance L but to the junction point thereof with the collector of transistor Tr, it appears that current I is not dependent upon voltage $V_B$, so that terminal $K'_B$ is not to be connected to voltage $V_B$.

For most applications the supply voltage circuit arrangement will be used for generating a constant output voltage. One application is that in which voltage $V_o$ varies in accordance with the variations of the adjusting voltage. Such a case presents itself in a color television receiver if the adjusting voltage Vr varies according to a parabola-like function with the field frequency, while voltage $V_o$ is the supply voltage of the line deflection circuit. As a result of this the line deflection current experiences a modulation at the field frequency which is required for the so-called east-west correction.

I claim:

1. A control circuit arrangement for generating a periodic pulsatory control signal for controlling a switch in a converter for converting an input direct voltage into an output direct voltage which is substantially independent of variations of the input voltage, the control circuit comprising, a current source, a controllable switch, a capacitor, means connecting the current source and the controllable switch to the capacitor so as to generate a sawtooth voltage across the capacitor, a threshold level detector coupled to the capacitor for converting the sawtooth voltage into said periodic pulsatory control signal having a pulse duration controllable under the influence of a source of adjusting voltage, a first circuit having a first and a second input terminal and means for adjusting the value of the current generated by the current source as a linear function of both the input direct voltage and the adjusting voltage, and a second circuit having a first and a second input terminal and means for adjusting the variation of the sawtooth voltage during the occurrence of the control signal as a linear function of both the input direct voltage and the adjusting voltage, the two first input terminals being connectable to the input direct voltage and the two second input terminals being connectable to the adjusting voltage source.

2. A circuit arrangement as claimed in claim 1 further comprising circuit means coupling a terminal of the output voltage to said source of adjusting voltage so that the adjusting voltage and the output voltage are proportional to each other.

3. A circuit arrangement as claimed in claim 1, characterized in that the adjusting means of said first and second circuits each comprise at least two resistors connected to the respective input terminals.

4. A circuit arrangement as claimed in claim 1, wherein said source of adjusting voltage comprises a feedback circuit including a comparison stage for comparing the converter output voltage with a source of reference voltage.

5. A circuit arrangement as claimed in claim 4 further comprising a starting circuit coupled to the feedback circuit for slowly starting the adjusting voltage after first switching on the circuit arrangement.

6. A circuit arrangement as claimed in claim 1 for controlling a converter in which the converter switch and an inductance are connected between a terminal supplying the input voltage and a terminal supplying the output voltage, and a diode coupled to a junction between the switch and the inductance, said first and second circuits being connected so that the variation of the sawtooth voltage occurs during the cut off time of the converter switch and is linearly dependent on the value of the input voltage and on the value of the adjusting voltage, and so that the value of the current generated by the current source is merely proportional to the value of the input voltage.

7. A circuit arrangement as claimed in claim 1 for controlling a converter in which the converter switch and an inductance are connected between a terminal supplying the input voltage and a terminal supplying the output voltage and in which a diode is coupled to a part of the inductance, said first and second circuits being connected so that the variation of the sawtooth voltage, which occurs during the cut off time of the converter switch, and the value of the current generated by the current source are linearly dependent on the value of the input voltage and on the value of the adjusting voltage.

8. A circuit arrangement as claimed in claim 1 for controlling a converter in which the converter switch and a diode are connected between a terminal supplying the input voltage and a terminal supplying the output voltage and in which an inductance is coupled to a junction point between the switch and the diode, said first and second circuits being connected so that the variation of the sawtooth voltage, which occurs during the cut off time of the converter switch, and the value of the current generated by the current source are both linearly dependent on the value of the input voltage and on the value of the adjusting voltage.

9. A circuit arrangement as claimed in claim 1 for controlling a converter in which an inductance and a diode are connected between a terminal supplying the input voltage and a terminal supplying the ouput voltage and in which the converter switch is coupled to a junction point between the inductance and the diode, said first and second circuits being connected so that the variation of the sawtooth voltage occurs during the conduction time of the switch and is linearly dependent on the value of the input voltage and on the value of the adjusting voltage, and so that the value of the current generated by the current source is merely proportional to the value of the adjusting voltage.

10. A circuit arrangement as claimed in claim 1 for controlling a converter in which a part of an inductance and a diode are connected between a terminal supplying the input voltage and a terminal supplying the output voltage and in which the converter switch is connected to the inductance, said first and second circuits being connected so that the variation of the sawtooth voltage, which occurs during the conduction time of the converter switch, and the value of the current generated by the current source are linearly dependent on the value of the input voltage and on the value of the adjusting voltage.

11. A circuit arrangement as claimed in claim 1, further comprising a voltage source connected in series with the controllable switch to form a series arrangement in parallel with the capacitor, and wherein the current generated by the current source is a discharge current for the capacitor, the voltage across the capacitor immediately prior to the charging thereof having a substantially constant value.

12. A circuit arrangement as claimed in claim 1, characterized in that the controllable switch is connected parallel to the capacitor and that the current generated by the current source is a charge current for the capacitor, the voltage across the capacitor immediately after the discharge thereof having a substantially constant value.

13. A circuit arrangement as claimed in claim 1 further comprising means connecting said two first input terminals to the input direct voltage.

14. A circuit arrangement as claimed in claim 13 further comprising means connecting said two second input terminals to the source of adjusting voltage.

15. A circuit arrangement as claimed in claim 1 further comprising means connecting said two second input terminals to the source of adjusting voltage.

16. A power supply circuit for supplying an output direct voltage that is substantially independent of variations of an input voltage comprising, an input terminal for a source of direct voltage, an output terminal for supplying said output direct voltage to a load, a first controlled switch, first circuit means including said first controlled switch for coupling the input terminal to the output terminal, and a control circuit coupled to a control electrode of the first controlled switch for producing a periodic pulsatory control signal for controlling the operation of said first controlled switch, the control circuit comprising, a current source, a second controlled switch, a capacitor, a source of periodic pulsatory signals coupled to a control terminal of the second switch so as to control the operation thereof, means connecting the current source and the second switch to the capacitor so as to generate a sawtooth-like voltage across the capacitor, a threshold level detector having a first input coupled to the capacitor to receive the sawtooth-like voltage, a second input and an output coupled to the control electrode of the first switch to supply said pulsatory control signal thereto, and second circuit means including a source of adjusting voltage coupled to the second input of the threshold level detector whereby the threshold level detector converts the sawtooth-like voltage into a periodic pulsatory control signal whose pulse duration is controlled by the adjusting voltage, said second circuit means further comprising means for setting the value of the current produced by the current source or the variation of the sawtooth-like voltage as a linear function of both the input direct voltage and the adjusting voltage.

17. A power supply circuit as claimed in claim 16 further comprising third circuit means coupling said output terminal to said source of adjusting voltage so that the adjusting voltage is proportional to the output voltage.

18. A power supply circuit as claimed in claim 17 further comprising a start-up circuit coupled to the output of said adjusting voltage source, said start-up circuit comprising, a resistor and second capacitor serially connected to a source of DC voltage, first and second rectifier devices connected in series opposition between said output of the adjusting voltage source and the second capacitor electrode which is connected to the resistor, and a second resistor connected between said DC voltage source and a common junction between said first and second rectifier devices.

19. A power supply circuit as claimed in claim 16 wherein said source of adjusting voltage comprises a feedback circuit including a comparison device having first and second inputs coupled to said output terminal and to a source of reference voltage, respectively, whereby the output of the comparison device produces an adjusting voltage that is proportional to the output voltage.

20. A power supply circuit as claimed in claim 16 wherein said second circuit means comprises, a first circuit having first and second input terminals connected to the direct voltage input terminal and the source of adjusting voltage, respectively, and means for setting the variation of the sawtooth-like voltage to be linearly dependent on the value of the input voltage and on the value of the adjusting voltage, and a second circuit having a first input terminal also connected to the direct voltage input terminal and means for setting the current produced by the current source to be proportional to the value of the input voltage.

21. A power supply circuit as claimed in claim 16 wherein said source of periodic pulsatory signals comprises the horizontal oscillator of a TV receiver, said first controlled switch comprises a switching transistor, and said first circuit means includes the horizontal deflection coil of the TV receiver and a capacitor and a diode coupled to said deflection coil.

* * * * *